US012759071B2

(12) United States Patent
Erhardt et al.

(10) Patent No.: US 12,759,071 B2
(45) Date of Patent: Oct. 13, 2026

(54) STUD WELDING DEVICE

(71) Applicant: Hilti Aktiengesellschaft, Schaan (LI)

(72) Inventors: Rolf Erhardt, Buchs SG (CH); Ralph Lippuner, Buchs (CH); Eric Schulte Suedhoff, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 695 days.

(21) Appl. No.: 18/267,225

(22) PCT Filed: Dec. 3, 2021

(86) PCT No.: PCT/EP2021/084152
§ 371 (c)(1),
(2) Date: Jun. 14, 2023

(87) PCT Pub. No.: WO2022/128531
PCT Pub. Date: Jun. 23, 2022

(65) Prior Publication Data

US 2024/0009751 A1 Jan. 11, 2024

(30) Foreign Application Priority Data

Dec. 17, 2020 (EP) .................................... 20214837

(51) Int. Cl.
*B23K 9/20* (2006.01)
*B23K 9/32* (2006.01)

(52) U.S. Cl.
CPC .............. *B23K 9/202* (2013.01); *B23K 9/325* (2013.01)

(58) Field of Classification Search
None
See application file for complete search history.

(56) References Cited

U.S. PATENT DOCUMENTS 2,790,066 A 4/1957 Haynes et al.
11,278,965 B2 3/2022 Huebinger
(Continued)

FOREIGN PATENT DOCUMENTS

CN 201168843 Y 12/2008
CN 101363623 A 2/2009
(Continued)

OTHER PUBLICATIONS

Gao Yangfeng, Hu Ao: Flow Field Analysis and Optimized Design of Local Drain Cover in Local Dry Method Welding, Hot Working Technology 2016, vol. 45, No. 11, pp. 178, 179, 180 and 187 (English translation) [see IDS Jan. 26, 2026].
(Continued)

*Primary Examiner* — John J Norton
(74) *Attorney, Agent, or Firm* — Leydig, Voit & Mayer, Ltd.

(57) ABSTRACT

A welding device for welding a stud to a substrate along a welding axis in a welding direction, comprising an inert gas cover with a welding chamber and a holding device holding the stud within the welding chamber during welding, wherein the cover has an input channel, a distribution chamber, a multiplicity of first connecting channels and an inert gas inlet into the welding chamber, wherein an inert gas feed line can be connected to the input channel, the input channel opening into the distribution chamber, the first connecting channels opening into the distribution chamber at different distances from the input channel, the first connecting channels connecting the distribution chamber pneumatically to the inert gas outlet, and wherein a common cross-sectional area of the first connecting channels is all the greater, the greater the distance from the input channel at which the first connecting channels open into the distribution chamber.

20 Claims, 3 Drawing Sheets

(56) References Cited

U.S. PATENT DOCUMENTS

Figure 1:
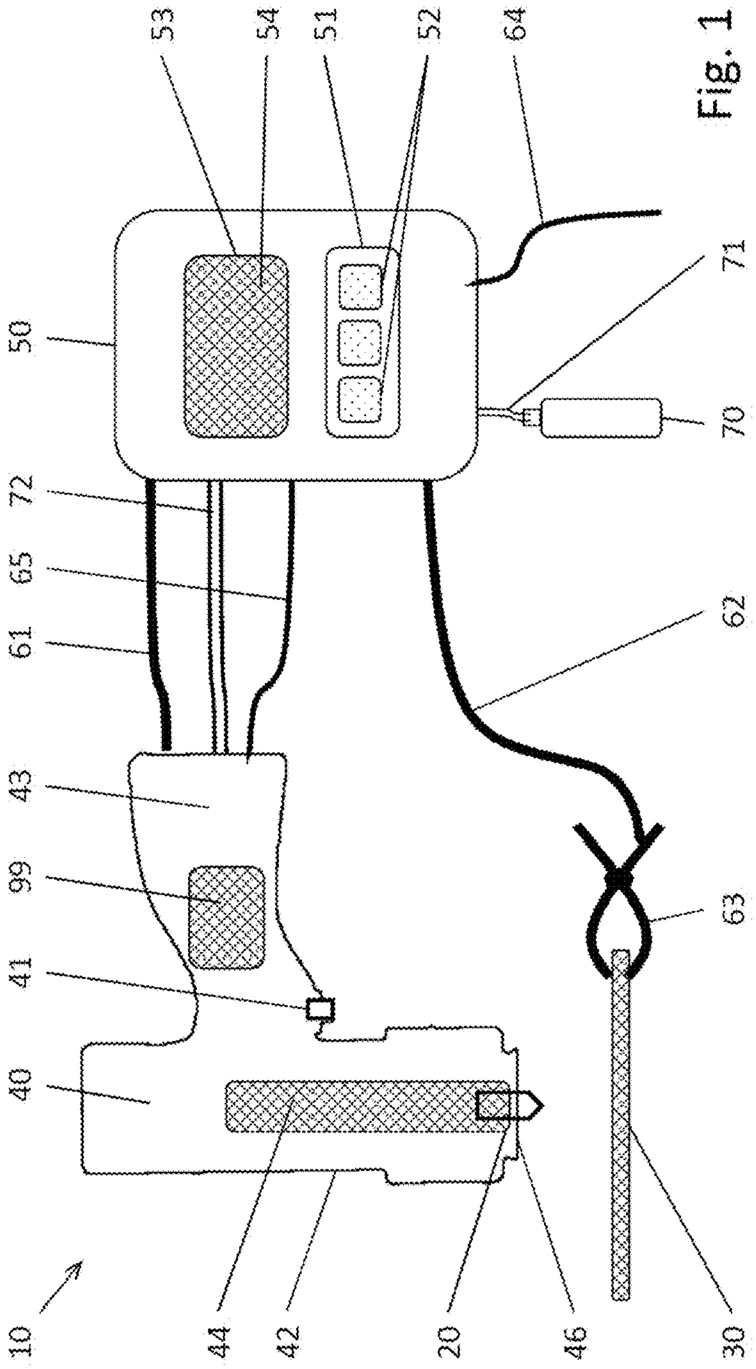

| | | | | |
|---|---|---|---|---|
| 11,465,237 | B2 | 10/2022 | Opitz | |
| 2006/0065650 | A1 | 3/2006 | Guo | |
| 2009/0107958 | A1 | 4/2009 | Khakhalev | |
| 2012/0100496 | A1 | 4/2012 | Boer | |
| 2017/0050198 | A1* | 2/2017 | Ohno | B23K 26/342 |
| 2017/0326675 | A1 | 11/2017 | Nab et al. | |
| 2019/0262901 | A1 | 8/2019 | Huebinger | |
| 2020/0093145 | A1* | 3/2020 | Powell | A47J 37/0718 |
| 2020/0240647 | A1* | 7/2020 | Itzkowitz | A21B 1/245 |
| 2020/0361032 | A1 | 11/2020 | Opitz | |
| 2021/0187650 | A1 | 6/2021 | Bertsch et al. | |

FOREIGN PATENT DOCUMENTS

| | | | |
|---|---|---|---|
| CN | 101417365 | A | 4/2009 |
| CN | 101426609 | A | 5/2009 |
| CN | 103894742 | A | 7/2014 |
| CN | 109890538 | A | 6/2019 |
| CN | 111278594 | A | 6/2020 |
| CN | 111727101 | A | 9/2020 |
| CN | 111954583 | A | 11/2020 |
| DE | 20 2016 100 923 | U1 | 3/2016 |
| DE | 102016217499 | A1 | 8/2017 |
| EP | 0780190 | A1 | 6/1997 |
| WO | WO 2008/011908 | A1 | 1/2008 |
| WO | WO 2019/120781 | A2 | 6/2019 |

OTHER PUBLICATIONS

Huang Shaoping Gai Yuxian Liu Huiying: Analysis on Key Technologies for All-position Closed Pipe Welding Head, Journal of Mechanical Engineering, Apr. 2011, pp. 104 to 109 (English translation) [see IDS Jan. 26, 2026].

International Searching Authority, International Search Report and Written Opinion in International Application No. PCT/EP2021/084152, mailed Apr. 5, 2022.

Gao Yangfeng, Hu Ao: Flow Field Analysis and Optimized Design of Local Drain Cover in Local Dry Method Welding, Hot Working Technology 2016, vol. 45, No. 11, pp. 178, 179, 180 and 187.

Huang Shaoping Gai Yuxian Liu Huiying: Analysis on Key Technologies for All-position Closed Pipe Welding Head, Journal of Mechanical Engineering, Apr. 2011, pp. 104 to 109.

* cited by examiner

STUD WELDING DEVICE

CROSS-REFERENCE TO RELATED APPLICATIONS

This patent application is the U.S. National Stage of International Patent Application No. PCT/EP2021/084152, filed Dec. 3, 2021, which is incorporated by reference, and which claims the benefit of European Patent Application No. 20214837.5, filed Dec. 17, 2020.

TECHNICAL FIELD

The invention relates generally to a welding device for welding a welding stud to a substrate along a welding axis in a welding direction. The invention relates in particular to a welding gun.

PRIOR ART

There are numerous known devices and methods by which various studs are fastened to a substrate in different applications. For example, a stud is brought into contact with the substrate and an electrical current is applied to it. For this purpose, the stud is held by an electrically conductive stud holder. As soon as the electrical current flows between the stud and the substrate, the stud is lifted off the substrate to form an arc. The energy that is released causes the material of the stud and the substrate to be partially liquefied. The electrical current is then switched off and the stud is immersed into the liquefied material while this material cools down and becomes solid. The stud is then connected to the substrate in an integrally bonded manner.

In order to provide the necessary energy for liquefying the material of the stud and the substrate in a sufficiently short time, there are known devices that generate an electrical current of a very high current intensity and use a correspondingly rated electrical cable to feed it to the stud. To avoid oxidizing of the liquefied material, it is known to suffuse the contact point between the stud and the substrate with an inert gas. The inert gas in this case flows past the welding point with the liquefied material and displaces from the ambient air the oxygen which under some circumstances is present there.

In the case of applications in building construction or shipbuilding for example, studs of various sizes with a thread to which an item is screwed are used in order to fasten the item to the substrate.

SUMMARY OF THE INVENTION

The object of the invention is to provide a device with which fastening of a stud to a substrate is improved.

In the case of a welding device for welding a welding stud to a substrate along a welding axis in a welding direction, comprising an inert gas cover with a welding chamber and comprising a holding device for holding the welding stud within the welding chamber during a welding operation, wherein the inert gas cover has an input channel, a distribution chamber, a multiplicity of first connecting channels and an inert gas inlet into the welding chamber, wherein an inert gas feed line can be connected to the input channel, wherein the input channel opens into the distribution chamber, wherein the first connecting channels open into the distribution chamber at different distances from the input channel, wherein the first connecting channels connect the distribution chamber pneumatically to the inert gas outlet, this object is achieved by a common cross-sectional area of the first connecting channels being all the greater, the greater the distance from the input channel at which the first connecting channels open into the distribution chamber. This has the effect of partially compensating for lower exposure of those first connecting channels that are at a greater distance from the input channel. As a result, under some circumstances the inert gas flows more uniformly to the welding point. The welding device is preferably formed as a welding gun.

An advantageous embodiment is characterized in that a cross-sectional area of individual first connecting channels is all the greater, the greater the distance from the input channel at which the first connecting channels open into the distribution chamber. A further advantageous embodiment is characterized in that a density of individual first connecting channels is all the greater, the greater the distance from the input channel at which the first connecting channels open into the distribution chamber.

An advantageous embodiment is characterized in that the inert gas inlet comprises a multiplicity of inlet openings arranged in the form of a ring around the welding axis.

An advantageous embodiment is characterized in that the first connecting channels run substantially parallel to the welding axis. A further advantageous embodiment is characterized in that the first connecting channels are arranged in the form of a ring around the welding axis. A further advantageous embodiment is characterized in that the distribution chamber is formed in the form of a ring around the welding axis.

An advantageous embodiment is characterized in that the first connecting channels open into the welding chamber and extend up to the inert gas inlet.

An advantageous embodiment is characterized in that the inert gas cover has a collecting chamber and a multiplicity of second connecting channels, wherein the first connecting channels and the second connecting channels open into the collecting chamber, and wherein the second connecting channels connect the collecting chamber pneumatically to the inert gas inlet. Preferably, a common cross-sectional area of the second connecting channels is smaller than a common cross-sectional area of the first connecting channels. Likewise preferably, the second connecting channels run substantially parallel to the welding axis. Likewise preferably, the second connecting channels are arranged in the form of a ring around the welding axis. Likewise preferably, the collecting chamber is formed in the form of a ring around the welding axis. Likewise preferably, the second connecting channels open into the welding chamber and extend up to the inert gas inlet.

An advantageous embodiment is characterized in that the inert gas cover has an opening facing in the welding direction.

EXEMPLARY EMBODIMENTS

Figure 3:
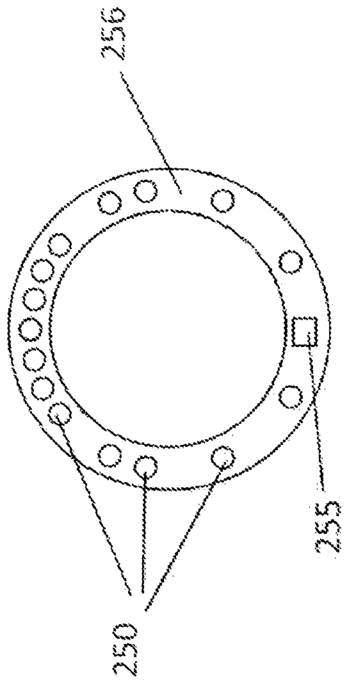
Figure 4:
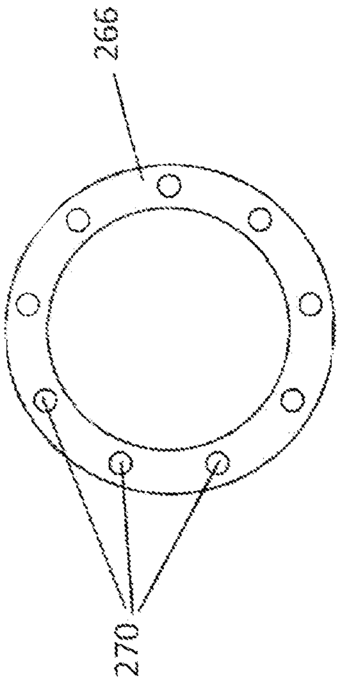
Figure 2:
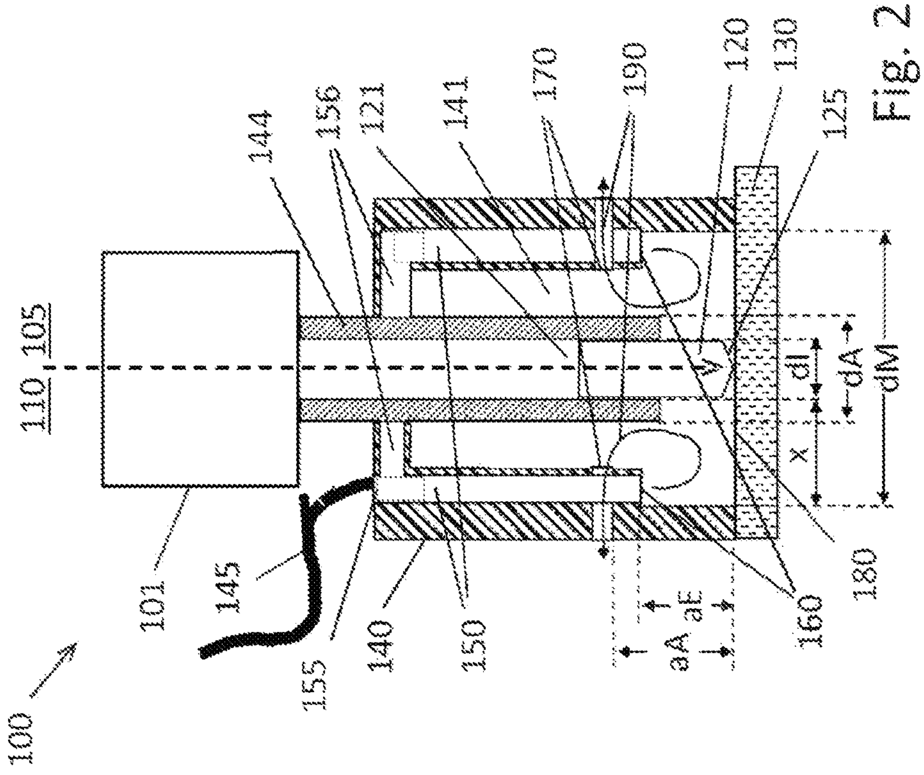
Figure 6:
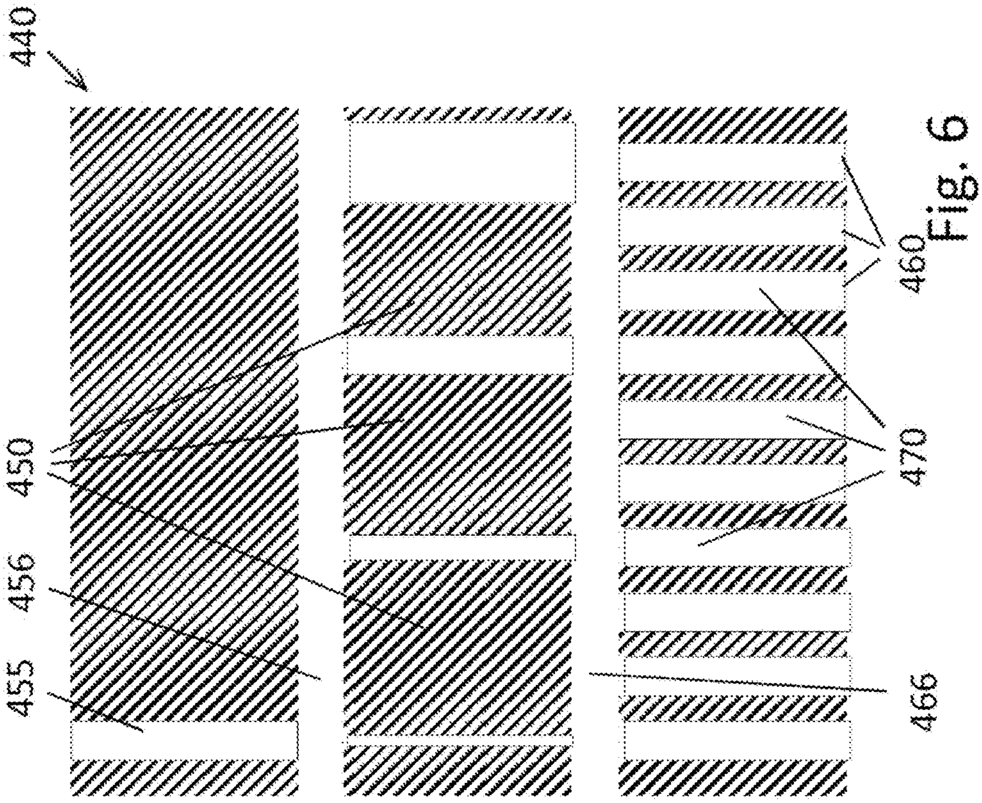
Figure 5:
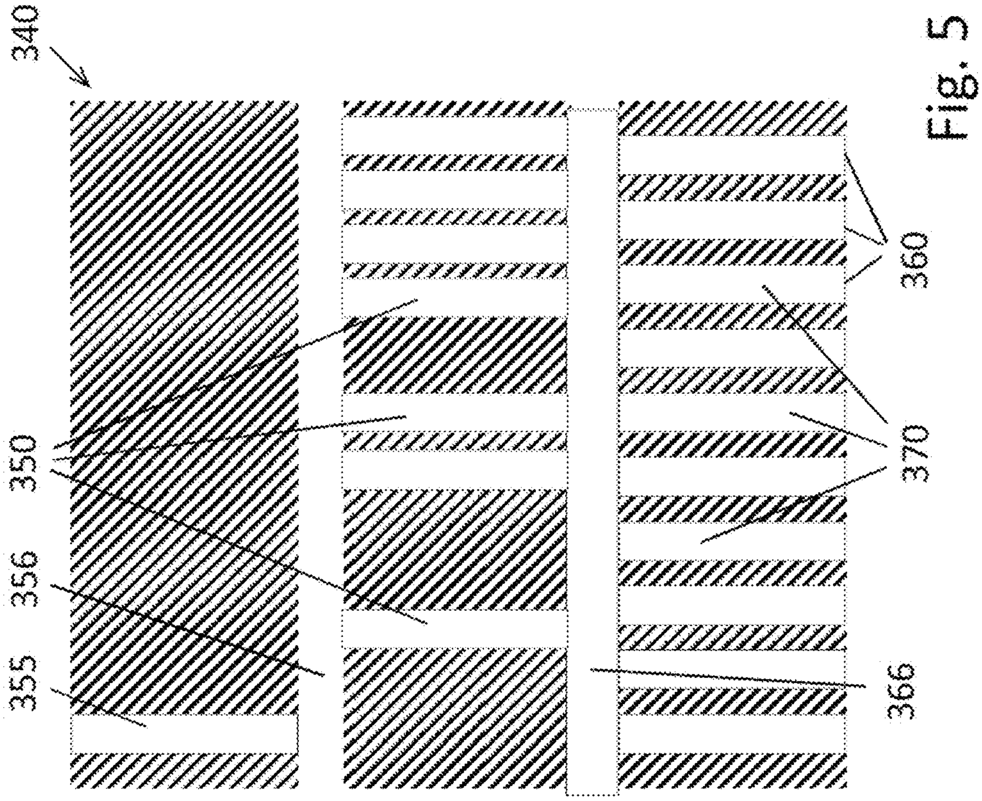

The invention will be explained in more detail below on the basis of exemplary embodiments with reference to the drawings, in which:

FIG. 1 schematically shows a welding device,

FIG. 2 schematically shows a welding device in a partial longitudinal sectional view, FIG. 3 schematically shows a distribution chamber, FIG. 4 shows a collecting chamber, FIG. 5 schematically shows an inert gas cover in a developed longitudinal sectional view, and FIG. 6 schematically shows an inert gas cover in a developed longitudinal sectional view.

In FIG. 1, a welding device 10 for welding a welding stud 20 to a substrate 30 is schematically shown. A material of the welding stud 20 and a material of the substrate 30 are electrically conductive, in particular metallic. The welding device 10 comprises a welding gun 40 with a trigger switch 41, formed as a pushbutton switch, a welding unit 50, a first electrical cable 61, a second electrical cable 62 with a connection terminal 63, an electrical supply cable 64, formed for example as a power cable, an electrical communication line 65, a gas reservoir 70, formed as a gas cylinder, a tubular gas supply line 71 and a gas hose 72.

The first cable 61 serves for supplying the welding stud 20 with electrical current through the welding unit 50. The second cable 62 serves for electrically connecting the substrate 30 to the welding unit 50 when the connection terminal 63 is clamped to the substrate 30. When the welding stud 20 comes into contact with the substrate 30, a circuit closes, so that welding current, for example in the form of direct current or alternating current, can be applied to the welding stud 20 through the welding unit 50. For this purpose, the welding gun 40 comprises a welding-current contact element that is not shown in FIG. 1. The welding unit 50 comprises a device that is not shown for converting electrical current from the supply cable 64 into welding current, which comprises for example an electrical capacitor, a thyristor, a bipolar transistor with an isolated gate electrode or other components from power electronics and also an associated control unit with a microprocessor, in order to provide the welding current at the desired voltage and current intensity.

The gas supply line 71 and the gas hose 72 serve for supplying a contact region between the welding stud 20 and the substrate 30 with an inert gas from the gas reservoir 70, in order to protect the contact region from oxidation due to oxygen from a surrounding area during a welding operation. For controlling a gas flow to the contact region, the gas reservoir the gas supply line 71, the welding unit 50, the gas hose 72 or the welding gun 40 comprises a valve (not shown), in particular a controllable valve.

The welding unit 50 has an input device 51 having actuating elements 52, and an output device 53 having a visual display element 54 and a wireless transmission unit. The input device 51 serves for the input of parameters of a welding method to be carried out with the welding device 10, for example the voltage, current intensity, power and time duration of the welding current, position and speed of the stud and so on, by a user of the welding device 10. The output device 53 serves to output information to the user, for example information about parameters of the welding method, information about detected emissions of the welding method or other variables, information about a quality of the welding operation, information about measures for improving the welding operation, information about detected characteristics of the welding stud, or information derived from the aforementioned variables, and/or recommendations or instructions for cleaning and/or maintaining the welding device in particular the welding gun 40.

The communication line 65 serves for communication between the welding gun in particular a control device of the welding gun 40 that is not shown in FIG. 1, and the welding unit 50, in particular the control unit and/or the input device 51 and/or the output device 53. By way of this communication, for example an exchange of information about the parameters of a welding operation is accomplished, in order for example to achieve synchronization of the welding current with a movement of the welding stud 20 or to make this easier. In exemplary embodiments that are not shown, the communication between the welding gun and the welding unit takes place wirelessly, by radio or by means of the first electrical cable, which carries the welding current.

The welding gun 40 has a housing 42 with an opening 46, from which a handle 43 having the trigger switch 41 protrudes. The welding gun 40 also has a stud holder 44, on which the welding stud 20 is held during a welding operation. For this purpose, the stud holder comprises for example two, three, four or more resilient arms (not shown in detail), between which the welding stud 20 is inserted and held by means of a clamping fit. For applying a welding current to the welding stud 20, the welding gun 40 also has a welding-current contact element, which is integrated in the stud holder 44, for example in the form of one or more of the resilient arms.

The welding gun 40 also has a control device 99 for controlling the various components and devices of the welding gun and of the welding unit 50. The control device 99 is intended for controlling one or more parameters of the welding operation. For this purpose, the control device 99 comprises various electronic components, for example one or more microprocessors, one or more temporary or permanent data memories, and the like.

The welding gun 40 also has a stud lifting device, which is formed as a first lifting magnet and acts on the stud holder 44 with a force rearwardly away from the opening 46 (upwardly in FIG. 1) when the stud lifting device is activated. Via a signal line (not shown), the control device 99 communicates with the stud lifting device in order to control the stud lifting device, in particular to activate and deactivate it.

The welding gun 40 also has a stud immersing device, formed as a spring element or as a second lifting magnet, which acts on the stud holder 44 with a force forwardly toward the opening 46 (downwardly in FIG. 1) when the stud immersing device is activated. Via a signal line (not shown), the control device 99 communicates with the stud immersing device in order to control the stud immersing device, in particular to activate and deactivate it. If the stud immersing device is formed as a spring element, this spring element is preferably tensioned when the stud holder is moved rearward by the stud lifting device, so that the spring element moves the stud holder forward as soon as the stud lifting device is deactivated.

In a welding method with the welding device 10, first the substrate 30 and the stud 20 are provided. In a further step, information, for example about desired parameters of the following welding operation, is input by a user via the input device. In a further step, a welding current between the welding stud 20 and the substrate 30 is applied to the welding stud 20 by the welding unit 50 by means of the first cable 61 and the second cable 62. In a further step, the welding stud 20 is lifted off the substrate by means of the stud lifting device while maintaining the welding current flowing between the welding stud 20 and the substrate 30, with an arc being formed between the welding stud 20 and the substrate 30. In particular on account of the heat generated by the arc, a material of the welding stud 20 and/or of the substrate 30 is then partially liquefied. In a further step, the welding stud 20 is immersed by means of the stud immersing device into the liquefied material of the welding stud 20 or of the substrate 30. The liquefied material of the welding stud 20 or of the substrate 30 then solidifies, so that the welding stud 20 is connected to the substrate 30 in an integrally bonded manner.

FIG. 2 schematically shows a longitudinal section of a welding device 100 which is intended for welding a welding stud 120 to a substrate 130 along a welding axis 105 in a welding direction 110. The welding device 100 is formed as a welding gun defining the welding direction 110. The welding device 100 has a holding device 144, formed as a stud holder, with an outside diameter dA, which holding device has a stud receptacle 121, with an inside diameter dI, for holding the welding stud 120 during a welding operation, into which the welding stud 120 can be inserted and is preferably held with a clamping action. A contact surface 125 of the welding stud 120 makes contact with the substrate 130 before and/or during the welding operation.

The welding device 100 comprises a schematically shown housing 101 with a handle (not shown) and a trigger switch (not shown) and also an inert gas cover 140, which is intended for being suffused with inert gas in order to suppress or completely prevent oxidation of the welding melt with oxygen from the ambient air. For this purpose, the inert gas cover 140 has an inert gas supply, which comprises an input channel 155, a distribution chamber 156 and a multiplicity of first connecting channels 150, arranged in the form of a ring around the welding axis 105. An inert gas feed line, for example an inert gas hose 145 or the like, for supplying the inert gas cover 140, can be connected to the input channel 155.

Each of the first connecting channels 150 running parallel to the welding axis 105 opens with an inlet opening 160 into a welding chamber 141 of the inert gas cover 140, so that the inlet openings 160 are likewise arranged in the form of a ring around the welding axis 105 and together form an inert gas inlet. The input channel 155 and the first connecting channels 150 open into the distribution chamber 156, wherein the first connecting channels 150 connect the distribution chamber 156 pneumatically to the inert gas inlet. A cross-sectional area of each of the individual first connecting channels 150 is all the greater, the greater the distance from the input channel 155 at which the first connecting channels 150 open into the distribution chamber 156. A drop in pressure over the distribution chamber 156, formed in the form of a ring around the welding axis 105, away from the input channel 155, causes lower exposure of those first connecting channels 150 that are at a greater distance from the input channel 155 (on the right side in FIG. 2). This lower exposure is partially compensated by the increased cross-sectional area. As a result, under some circumstances the inert gas flows more uniformly to the welding point.

Furthermore, the inert gas cover 140 has a multiplicity of outlet openings 170, which are likewise arranged in the form of a ring around the welding axis, lead radially with respect to the welding axis 105 through the inert gas cover 140 outward into the surrounding area and form an inert gas outlet. In a direction transverse to the welding axis 105 (in FIG. 2 perpendicularly to the plane of the drawing), in particular in the circumferential direction, the outlet openings 170 are respectively arranged offset from the inlet openings 160.

Furthermore, the inert gas cover 140 has an opening 180, which faces in the welding direction 110 and has transversely to the welding direction 110 an opening diameter dM. The inert gas inlet, to be specific the inlet openings 160, is/are at an inlet distance aE from the opening 180 counter to the welding direction 110. The inert gas outlet, to be specific the outlet openings 170, is/are at an outlet distance aA from the opening 180 counter to the welding direction 110.

The outlet distance aA is approximately half the size of a difference between the opening diameter dM and the inside diameter dI, that is to say approximately the same size as a radial distance x between the welding stud 120 and the inert gas cover 140. Furthermore, the outlet distance aA is greater than the inlet distance aE. When the opening 180 is covered by the substrate 130, inert gas flowing into the welding chamber 141 through the inlet openings 160 flows along the flow paths 190 first to a radially outer region of the opening 180, then from all sides radially inward to the welding stud 120, and then substantially axially upward to the outlet openings 170. This causes the formation of a toroidal flow pattern, which is arranged radially symmetrically around the welding axis 105, and has the effect of uniformly and effectively suffusing the welding point at the welding stud 120 with inert gas. Ambient air, which for example only slowly escapes from the narrow gap between the holding device 144 and the inert gas cover (in FIG. 2 above the outlet openings 170), is entrained by the flow through the outlet openings 170 and is kept away from the welding point.

In FIG. 3, a distribution chamber 256 of a further exemplary embodiment is schematically shown, the viewing direction coinciding with the welding direction. An input channel 255 and a multiplicity of first connecting channels 250 open into the distribution chamber 256. The density of individual first connecting channels 250 is all the greater, the greater the distance from the input channel 255 at which the first connecting channels 250 open into the distribution chamber 256. Closest to the input channel 255 (at the bottom in FIG. 3), only individual first connecting channels 250 are arranged. By contrast, larger groups of first connecting channels 250 lying closely together are arranged on the opposite side of the distribution chamber 256 (at the top in FIG. 3), seen from the input channel 255. As a result, a common cross-sectional area of the first connecting channels 250 is all the greater, the greater the distance from the input channel 255 at which the first connecting channels 250 open into the distribution chamber 256.

In FIG. 4, a collecting chamber 266 of the exemplary embodiment shown in FIG. 3 is schematically shown, the viewing direction coinciding with the welding direction. In addition to the first connecting channels that are not shown in FIG. 4, a multiplicity of second connecting channels 270 open into the collecting chamber 266. The second connecting channels 270 are arranged in the form of a ring around the welding axis and are distributed uniformly over the circumference of the collecting chamber 266 likewise arranged in the form of a ring around the welding axis. A number of the second connecting channels 270 is smaller than a number of the first connecting channels 250 shown in FIG. 3, so that a common cross-sectional area of the second connecting channels 270 is smaller than a common cross-sectional area of the first connecting channels 250. As a result, under some circumstances a flow rate of the inert gas flowing through the first connecting channels 250 and the second connecting channels 270 is made more uniform. This in turn has the effect of more uniform exposure of a welding point that is not shown to inert gas.

In FIG. 5, an inert gas cover 340 is shown in a developed longitudinal sectional view, so that the arrangement of the flow channels along a circumference of the substantially cylindrical, in particular circular-cylindrical, inert gas cover 340 can be seen. The inert gas cover 340 comprises an input channel 355, a distribution chamber 356, a multiplicity of first connecting channels 350, a collecting chamber 366 and a multiplicity of second connecting channels 370. The input channel 355 opens into the distribution chamber 356. The first connecting channels 350 open on the one hand into the distribution chamber 356 and on the other hand into the collecting chamber 366. The second connecting channels 370 open on the one hand into the collecting chamber 366 and on the other hand into a welding chamber that is not shown any further, for which purpose they extend up to inlet openings 360 forming an inert gas inlet. The input channel 355, the first connecting channels 350 and the second connecting channels 370 run substantially parallel to a welding axis and connect an inert gas feed line, which is connected to the input channel 355, pneumatically to the welding chamber of the inert gas cover 340.

With increasing distance from the input channel 355, the first connecting channels 350 are arranged in increasingly large groups, so that a density of the first connecting channels 350 is all the greater, the greater the distance from the input channel 355 at which the first connecting channels 350 open into the distribution chamber 356. As a result, a common cross-sectional area of the first connecting channels 350 is also all the greater, the greater the distance from the input channel 355 at which the first connecting channels 350 open into the distribution chamber 356. As explained with respect to the previous exemplary embodiments, as a result, under some circumstances the inert gas flows more uniformly to the welding point.

In FIG. 6, an inert gas cover 440 is shown in a developed longitudinal sectional view, so that the arrangement of the flow channels along a circumference of the substantially cylindrical, in particular circular-cylindrical, inert gas cover 440 can be seen. The inert gas cover 440 comprises an input channel 455, a distribution chamber 456, a multiplicity of first connecting channels 450, a collecting chamber 466 and a multiplicity of second connecting channels 470. The input channel 455 opens into the distribution chamber 456. The first connecting channels 450 open on the one hand into the distribution chamber 456 and on the other hand into the collecting chamber 466. The second connecting channels 470 open on the one hand into the collecting chamber 466 and on the other hand into a welding chamber that is not shown any further, for which purpose they extend up to inlet openings 460 forming an inert gas inlet. The input channel 455, the first connecting channels 450 and the second connecting channels 470 run substantially parallel to a welding axis and connect an inert gas feed line, which is connected to the input channel 455, pneumatically to the welding chamber of the inert gas cover 440.

With increasing distance from the input channel 455, a cross-sectional area of individual first connecting channels 450 becomes all the greater, the greater the distance from the input channel 455 at which the first connecting channels 450 open into the distribution chamber 456. As a result, a common cross-sectional area of the first connecting channels 450 is also all the greater, the greater the distance from the input channel 455 at which the first connecting channels 450 open into the distribution chamber 456. As explained with respect to the previous exemplary embodiments, as a result, under some circumstances the inert gas flows more uniformly to the welding point.

The invention has been described on the basis of examples of a welding gun. In this case, the features of the described embodiments can also be combined as desired with one another within a single fastening device. It is pointed out that the device according to the invention is also suitable for other purposes.

The invention claimed is:

1. A welding device for welding a welding stud to a substrate along a welding axis in a welding direction, comprising an inert gas cover with a welding chamber and comprising a holding device for holding the welding stud within the welding chamber during a welding operation, wherein the inert gas cover has an input channel, a distribution chamber, a multiplicity of first connecting channels and an inert gas inlet into the welding chamber, wherein an inert gas feed line can be connected to the input channel, wherein the input channel opens into the distribution chamber, wherein the first connecting channels open into the distribution chamber at different distances from the input channel, wherein the first connecting channels connect the distribution chamber pneumatically to an inert gas outlet, wherein a common cross-sectional area of the first connecting channels is all the greater, the greater the distance from the input channel at which the first connecting channels open into the distribution chamber.

2. The welding device as claimed in claim 1, wherein a cross-sectional area of individual first connecting channels is all the greater, the greater the distance from the input channel at which the first connecting channels open into the distribution chamber.

3. The welding device as claimed in claim 2, wherein a density of individual first connecting channels is all the greater, the greater the distance from the input channel at which the first connecting channels open into the distribution chamber.

4. The welding device as claimed in claim 2, wherein the inert gas inlet comprises a multiplicity of inlet openings arranged in the form of a ring around the welding axis.

5. The welding device as claimed in claim 2, wherein the first connecting channels run substantially parallel to the welding axis.

6. The welding device as claimed in claim 1, wherein a density of individual first connecting channels is all the greater, the greater the distance from the input channel at which the first connecting channels open into the distribution chamber.

7. The welding device as claimed in claim 6, wherein the inert gas inlet comprises a multiplicity of inlet openings arranged in the form of a ring around the welding axis.

8. The welding device as claimed in claim 6, wherein the first connecting channels run substantially parallel to the welding axis.

9. The welding device as claimed in claim 1, wherein the inert gas inlet comprises a multiplicity of inlet openings arranged in the form of a ring around the welding axis.

10. The welding device as claimed in claim 1, wherein the first connecting channels run substantially parallel to the welding axis.

11. The welding device as claimed in claim 1, wherein the first connecting channels are arranged in the form of a ring around the welding axis.

12. The welding device as claimed in claim 1, wherein the distribution chamber is formed in the form of a ring around the welding axis.

13. The welding device as claimed in claim 1, wherein the first connecting channels open into the welding chamber and extend up to the inert gas inlet.

14. The welding device as claimed in claim 1, wherein the inert gas cover has a collecting chamber and a multiplicity of second connecting channels, wherein the first connecting channels and the second connecting channels open into the collecting chamber, and wherein the second connecting channels connect the collecting chamber pneumatically to the inert gas inlet.

15. The welding device as claimed in claim 14, wherein a common cross-sectional area of the second connecting channels is smaller than a common cross-sectional area of the first connecting channels.

16. The welding device as claimed in claim 14, wherein the second connecting channels run substantially parallel to the welding axis.

17. The welding device as claimed in claim 14, wherein the second connecting channels are arranged in the form of a ring around the welding axis.

18. The welding device as claimed in claim 14, wherein the collecting chamber is formed in the form of a ring around the welding axis.

19. The welding device as claimed in claim 14, wherein the second connecting channels open into the welding chamber and extend up to the inert gas inlet.

20. The welding device as claimed in claim 1, wherein the inert gas cover has an opening facing in the welding direction.

* * * * *